United States Patent
Wi et al.

(10) Patent No.: US 9,316,307 B2
(45) Date of Patent: Apr. 19, 2016

(54) HYDRAULIC PRESSURE SUPPLY SYSTEM OF AUTOMATIC TRANSMISSION FOR VEHICLE

(71) Applicant: Hyundai Motor Company, Seoul (KR)

(72) Inventors: Taehwan Wi, Bucheon-Si (KR); Jin Young Hwang, Busan (KR); Se Hwan Jo, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 200 days.

(21) Appl. No.: 14/139,821

(22) Filed: Dec. 23, 2013

(65) Prior Publication Data
US 2015/0027570 A1 Jan. 29, 2015

(30) Foreign Application Priority Data

Jul. 29, 2013 (KR) .................. 10-2013-0089487

(51) Int. Cl.
| | |
|---|---|
| F04B 49/24 | (2006.01) |
| F15B 11/17 | (2006.01) |
| F04C 14/26 | (2006.01) |
| F16H 61/44 | (2006.01) |
| F16H 61/00 | (2006.01) |
| F16H 61/4043 | (2010.01) |

(Continued)

(52) U.S. Cl.
CPC ............ *F16H 61/0031* (2013.01); *F04B 49/24* (2013.01); *F04C 14/02* (2013.01); *F04C 14/26* (2013.01); *F15B 11/17* (2013.01); *F16H 41/00* (2013.01); *F16H 61/0021* (2013.01); *F16H 61/4008* (2013.01); *F16H 61/4035* (2013.01); *F16H 61/4043* (2013.01); *F15B 2211/20584* (2013.01); *F15B 2211/20592* (2013.01); *F16H 2061/0037* (2013.01); *Y10T 137/0379* (2015.04); *Y10T 137/85954* (2015.04); *Y10T 137/8601* (2015.04); *Y10T 137/86002* (2015.04); *Y10T 137/86027* (2015.04); *Y10T 137/86139* (2015.04)

(58) Field of Classification Search
CPC ................... F16H 2061/0037; F16H 61/0031; F16H 61/4017; F16H 61/461; F16H 61/478; F16H 61/0025; F16H 61/4043; Y10T 137/86002; Y10T 137/86027; Y10T 137/0379; Y10T 137/86139; F04C 14/02; F04C 14/26; F04C 23/04; F15B 11/17; F15B 2211/20592; F15B 2211/20584; F04B 23/04; F04B 49/24
See application file for complete search history.

(56) References Cited

U.S. PATENT DOCUMENTS

| | | | | |
|---|---|---|---|---|
| 6,138,638 | A * | 10/2000 | Morikawa | ............ F02D 41/061 123/295 |
| 6,196,806 | B1 * | 3/2001 | Van Der Sluis | ... F16H 61/66272 417/295 |

(Continued)

FOREIGN PATENT DOCUMENTS

| | | |
|---|---|---|
| JP | 11-37242 A | 2/1999 |
| JP | 3827926 B2 | 4/2001 |
| JP | 4754962 B2 | 7/2007 |

*Primary Examiner* — Atif Chaudry
(74) *Attorney, Agent, or Firm* — Morgan, Lewis & Bockius LLP

(57) ABSTRACT

A hydraulic pressure supply system may supply low hydraulic pressure generated at a low-pressure hydraulic pump to a low pressure portion through a low-pressure regulator valve, may supply a portion of the low hydraulic pressure to a high-pressure hydraulic pump, and may supply high hydraulic pressure generated at the high-pressure hydraulic pump to a high pressure portion through a high-pressure regulator valve.

17 Claims, 2 Drawing Sheets

(51) Int. Cl.
  *F04C 14/02* (2006.01)
  *F16H 41/00* (2006.01)
  *F16H 61/4008* (2010.01)
  *F16H 61/4035* (2010.01)

(56) References Cited

U.S. PATENT DOCUMENTS

| | | | | |
|---|---|---|---|---|
| 6,227,167 B1 * | 5/2001 | Smith | ................... | F02M 59/06 123/446 |
| 6,293,253 B1 * | 9/2001 | Arnold | ................... | F02D 41/38 123/446 |
| 6,293,765 B1 * | 9/2001 | Peterson | ............... | E02F 9/2239 417/288 |
| 6,941,922 B2 * | 9/2005 | Williams | ................. | F01M 1/02 123/196 R |
| 7,163,481 B2 | 1/2007 | Takagi et al. | | |
| 7,331,323 B2 * | 2/2008 | Hara | ......................... | F01L 1/46 123/196 A |
| 8,042,672 B2 * | 10/2011 | Grethel | ............... | F16H 61/0021 192/113.3 |
| 8,512,008 B2 * | 8/2013 | Park | ..................... | F16H 61/0025 417/250 |
| 8,668,468 B2 * | 3/2014 | Hwang | ............... | F16H 61/0025 417/253 |
| 2006/0065217 A1 * | 3/2006 | Ikegawa | ................... | F01M 1/02 123/41.42 |
| 2012/0085441 A1 * | 4/2012 | Park | ..................... | F16H 61/0025 137/565.11 |
| 2012/0141302 A1 * | 6/2012 | Hwang | ............... | F16H 61/0025 417/253 |
| 2013/0133766 A1 * | 5/2013 | Hwang | ............... | F16H 61/0021 137/565.13 |
| 2014/0290767 A1 * | 10/2014 | Jo | ....................... | F16H 61/0276 137/565.11 |

* cited by examiner

HYDRAULIC PRESSURE SUPPLY SYSTEM OF AUTOMATIC TRANSMISSION FOR VEHICLE

CROSS-REFERENCE TO RELATED APPLICATION

The present application claims priority to Korean Patent Application No. 10-2013-0089487 filed on Jul. 29, 2013, the entire contents of which is incorporated herein for all purposes by this reference.

BACKGROUND OF THE INVENTION

1. Field of the Invention

The present invention relates to a hydraulic pressure supply system of an automatic transmission for a vehicle. More particularly, the present invention relates to a hydraulic pressure supply system of an automatic transmission for a vehicle which improves responsiveness and stability of the system by entirely supplying generated hydraulic pressure to a high pressure portion when initial starting and improves reliability by operating the system normally by hydraulic pressure of a low-pressure hydraulic pump when a high-pressure hydraulic pump is stopped.

2. Description of Related Art

Recently, vehicle makers direct all their strength to improve fuel economy due to worldwide high oil prices and strengthen of exhaust gas regulations.

Improvement of fuel economy may be achieved by improving power delivery efficiency, and the improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion.

Therefore, fuel economy may be improved by minimizing power consumption for driving the hydraulic pump, and noise and vibration may be reduced and durability may be improved by reducing load applied to the hydraulic pump.

After the hydraulic pressure generated at the low-pressure hydraulic pump is supplied to the high-pressure hydraulic pump, however, the high hydraulic pressure is generated in a conventional hydraulic pressure supply system. Therefore, if the high-pressure hydraulic pump is out of order, the oil supplied to the high pressure portion may be insufficient. Therefore, vehicle is hard to be driven.

In addition, since the low-pressure hydraulic pump is always operated, durability of the low-pressure hydraulic pump may be deteriorated. If the low-pressure hydraulic pump is out of order or is stopped, the system cannot be operated. Therefore, stability and reliability may be low.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle having advantages of improving responsiveness and stability of the system as a consequence of entirely supplying generated hydraulic pressure to a high pressure portion when initial starting and improving reliability as a consequence of operating the system normally by hydraulic pressure of a low-pressure hydraulic pump when a high-pressure hydraulic pump is stopped.

A hydraulic pressure supply system of an automatic transmission for a vehicle according to an exemplary embodiment of the present invention may generate a low hydraulic pressure and a high hydraulic pressure using oil stored in an oil pan and may supply the low hydraulic pressure and the high hydraulic pressure respectively to a low pressure portion and a high pressure portion.

In an aspect of the present invention, a hydraulic pressure supply system of an automatic transmission for a vehicle which generates a low hydraulic pressure and a high hydraulic pressure using oil stored in an oil pan and supplies the low hydraulic pressure and the high hydraulic pressure respectively to a low pressure portion and a high pressure portion, may include a low-pressure hydraulic pump receiving the oil stored in the oil pan through an input line, generating the low hydraulic pressure, and discharging the low hydraulic pressure to a first low-pressure line, a low-pressure regulator valve connected to the first low-pressure line and regulating the hydraulic pressure of the first low-pressure line to stable low hydraulic pressure and supplying the stable low hydraulic pressure to a second low-pressure line, a first switch valve selectively connecting the second low-pressure line to a third low-pressure line connected to the low pressure portion, a first bypass line bypassing the first switch valve and connecting the first low-pressure line with the second low-pressure line, a high-pressure hydraulic pump connected to the first low-pressure line and increasing the hydraulic pressure supplied through the first low-pressure line to generate the high hydraulic pressure, and discharging the high hydraulic pressure to a high-pressure line connected to the high pressure portion, a second bypass line bypassing the high-pressure hydraulic pump and connecting the first low-pressure line with the high-pressure line, a second switch valve disposed on the second bypass line and selectively supplying the hydraulic pressure of the first low-pressure line to the high-pressure line, and a high-pressure regulator valve disposed on the high-pressure line, regulating the hydraulic pressure supplied from the high-pressure hydraulic pump and the hydraulic pressure selectively supplied through the second switch valve to stable high hydraulic pressure, and supplying the regulated hydraulic pressure to the high pressure portion.

The low-pressure hydraulic pump is a mechanical hydraulic pump driven by an engine, and the high-pressure hydraulic pump is an electric hydraulic pump driven by a motor.

The low-pressure regulator valve regulates the hydraulic pressure of the first low-pressure line to be stable by recirculating a portion of the hydraulic pressure of the first low-pressure line through a first recirculation line, and supplies the regulated hydraulic pressure to the second low-pressure line.

The first recirculation line is connected to the input line.

The low-pressure regulator valve is controlled by control pressure of a first solenoid valve, elastic force of an elastic member, and the hydraulic pressure of the first low-pressure line counteracting against the control pressure and the elastic force.

The first switch valve is controlled by recirculated hydraulic pressure supplied from the high-pressure regulator valve and elastic force of an elastic member counteracting against the recirculated hydraulic pressure.

The high-pressure regulator valve regulates the hydraulic pressure of the high-pressure line to be stable by recirculating a portion of the hydraulic pressure of the high-pressure line through a second recirculation line and a third recirculation line.

The second recirculation line is connected to the first switch valve and the third recirculation line is connected to the third low-pressure line.

The high-pressure regulator valve is controlled by control pressure of a second solenoid valve and elastic force of an elastic member, and the hydraulic pressure of the high-pressure line counteracting against the control pressure and the elastic force.

The second switch valve is controlled by control pressure of the first solenoid valve and elastic force of an elastic member counteracting against the control pressure.

An orifice is mounted on the first bypass line.

In another aspect of the present invention, a hydraulic pressure supply system of an automatic transmission for a vehicle which supplies low hydraulic pressure generated at a low-pressure hydraulic pump to a low pressure portion through a low-pressure regulator valve, supplies a portion of the low hydraulic pressure to a high-pressure hydraulic pump, and supplies high hydraulic pressure generated at the high-pressure hydraulic pump to a high pressure portion through a high-pressure regulator valve, may include a first switch valve disposed on a low-pressure line connecting the low-pressure regulator valve with the low pressure portion, and selectively opening or closing the low-pressure line, a first bypass line bypassing the first switch valve and connecting the low-pressure regulator valve with the low pressure portion, a second bypass line bypassing the high-pressure hydraulic pump and connecting the low-pressure hydraulic pump with the high-pressure regulator valve, and a second switch valve disposed on the second bypass line and selectively opening or closing the second bypass line.

An orifice is mounted on the first bypass line.

The low-pressure regulator valve regulates hydraulic pressure supplied thereto to be stable by recirculating a portion of the hydraulic pressure to the low-pressure hydraulic pump.

The high-pressure regulator valve regulates hydraulic pressure supplied thereto to be stable by supplying a portion of the hydraulic pressure to the first switch valve as control pressure and to the low pressure portion.

The low-pressure regulator valve and the second switch valve receive control pressure from one solenoid valve.

The high-pressure regulator valve receives control pressure from another solenoid valve.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
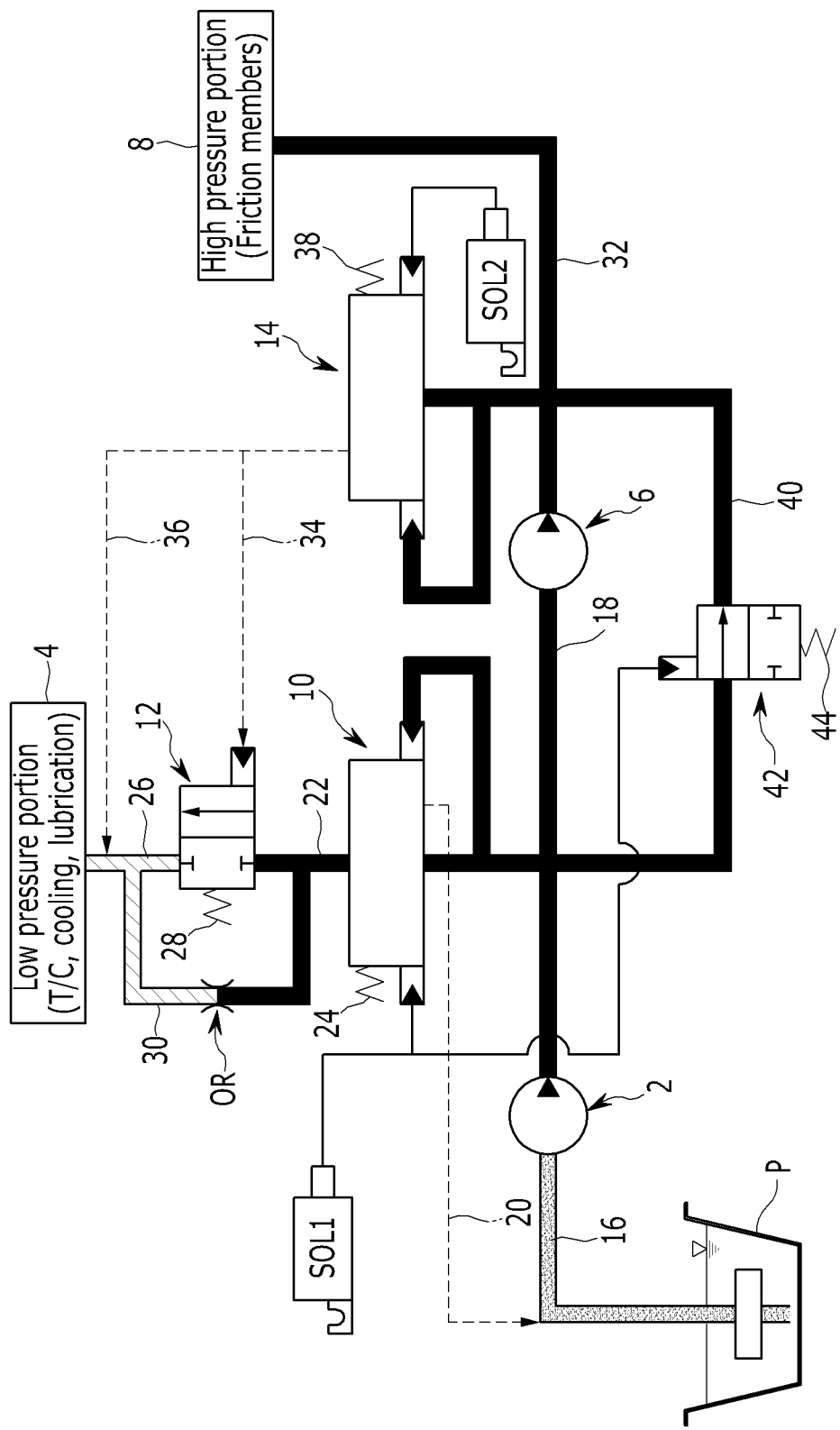
FIG. 1 is a schematic diagram of a hydraulic pressure supply system according to an exemplary embodiment of the present invention illustrating operation at an initial starting.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a hydraulic pressure supply system according to an exemplary embodiment of the present invention illustrating operation at an initial starting.

Referring to FIG. 1, a hydraulic pressure supply system according to an exemplary embodiment of the present invention is adapted to supply a low hydraulic pressure generated by a low-pressure hydraulic pump 2 to a low pressure portion 4 such as a torque converter (T/C), a cooling portion, and a lubrication portion and to supply a high hydraulic pressure generated by a high-pressure hydraulic pump 6 to a high pressure portion 8 for operating friction members related to shifting.

The low hydraulic pressure is a lower pressure facilitating operation of the torque converter (T/C) and cooling and lubrication, and the high hydraulic pressure is a high pressure facilitating operation of a plurality of friction members.

The low hydraulic pressure is generated at the low-pressure hydraulic pump 2 and is supplied to the low pressure portion 4 through a low-pressure regulator valve 10 and a first switch valve 12. A portion of the low hydraulic pressure is supplied to the high-pressure hydraulic pump 6. The high-pressure hydraulic pump 6 increases the portion of the low hydraulic pressure so as to generate the high hydraulic pressure, and supplies the generated high hydraulic pressure to the high pressure portion 8 through a high-pressure regulator valve 14.

The low-pressure hydraulic pump 2, as well known to a person of an ordinary skill in the art, may be a mechanical pump driven by torque of an engine or an electric pump driven by a motor.

The low-pressure hydraulic pump 2 is connected to an oil pan P through an input line 16, and the low hydraulic pressure generated by the low-pressure hydraulic pump 2 is discharged to a first low-pressure line 18.

The low-pressure regulator valve 10 recirculates a portion of the hydraulic pressure supplied from the first low-pressure line 18 to the first input line 16 through a first recirculation line 20, and thereby regulates the hydraulic pressure. The regulated hydraulic pressure regulated by the low-pressure regulator valve 10 is supplied to the first switch valve 12 through a second low-pressure line 22.

For this purpose, the low-pressure regulator valve 10 is a typical spool valve. In addition, the low-pressure regulator valve 10 is controlled by control pressure of a first solenoid valve SOL1 and elastic force of an elastic member 24, and the hydraulic pressure of the first low-pressure line 18 counteracting against the control pressure and the elastic force. The elastic force of the elastic member 24 may be set according to a target pressure of the second low-pressure line 22.

The first switch valve 12 is a spool valve and is disposed between the second low-pressure line 22 and a third low-pressure line 26 connected to the low pressure portion 4. In addition, the first switch valve 12 is controlled by recirculated hydraulic pressure of the high-pressure regulator valve 14 and elastic force of an elastic member 28 counteracting against the recirculated hydraulic pressure. The first switch valve 12 selectively supplies the hydraulic pressure of the second low-pressure line 22 to the third low-pressure line 26.

In addition, a first bypass line 30 bypasses the first switch valve 12. That is, the first bypass line 30 is bifurcated from the second low-pressure line 22 and joins to the third low-pressure line 26. An orifice OR is mounted on the first bypass line 30. Therefore, even though the first switch valve 12 disconnects the second low-pressure line 22 from the third low-pressure line 26, minimum hydraulic pressure is supplied to the third low-pressure line 26 through the first bypass line 30.

In addition, the high-pressure hydraulic pump 6 may be a mechanical pump or electric pump. The high-pressure hydraulic pump 6 increases the low hydraulic pressure supplied through the first low-pressure line 18 to the high hydraulic pressure, and discharges the high hydraulic pressure to the high-pressure line 32.

In addition, the hydraulic pressure discharged from the high-pressure hydraulic pump 6 to the high-pressure line 32 is regulated by the high-pressure regulator valve 14, and then is supplied to the high pressure portion 8.

The high-pressure regulator valve 14 is disposed on the high-pressure line 32 and is connected to the first switch valve 12 and the third low-pressure line 26 through second and third recirculation lines 34 and 36. Therefore, the high-pressure regulator valve 14 regulates the high hydraulic pressure to be stable by supplying a portion of the hydraulic pressure supplied through the high-pressure line 32 to the first switch valve 12 as control pressure through the second recirculation line 34 or to the low pressure portion 4 through the third recirculation line 36.

For this purpose, the high-pressure regulator valve 14 may be a spool valve. In addition, the high-pressure regulator valve 14 is controlled by control pressure of a second solenoid valve SOL2 and elastic force of an elastic member 38, and the hydraulic pressure of the high-pressure line 32 counteracting against the control pressure and the elastic force. The elastic force of the elastic member 38 may be set according to a target pressure of the high-pressure line 32.

In addition, the first low-pressure line 18 and the high-pressure line 32 are connected by a second bypass line 40, and a second switch valve 42 is disposed on the second bypass line 40.

The second switch valve 42 may be a spool valve and is controlled by the control pressure of the first solenoid valve SOL1 and elastic force of an elastic member 44 counteracting the control pressure so as to selectively connect the first low-pressure line 18 with the high-pressure line 32.

The first and second solenoid valves SOL1 and SOL2 receive control pressure from a reducing valve connected to the high-pressure line 30.

In the hydraulic pressure supply system according to the exemplary embodiment of the present invention, the first solenoid valve SOL1 is switched on at initial starting. As shown in FIG. 1, the second switch valve 42 connects the first low-pressure line 18 with the high-pressure line 32 through the second bypass line 40.

Therefore, the generated hydraulic pressure is entirely supplied to the high-pressure line 32 through the high-pressure hydraulic pump 6 and the second bypass line 40 at the initial starting. Therefore, responsiveness may be improved and stability of the system may also be improved.

In addition, even though the high-pressure hydraulic pump 6 is out of order or does not work, the hydraulic pressure can be supplied to the high pressure portion 8 through the second bypass line 40. Therefore, reliability may be secured.

Meanwhile, since the hydraulic pressure recirculated from the high-pressure regulator valve 14 through the second and third recirculation lines 34 and 36 is low, the first switch valve 12 disconnects the second low-pressure line 22 from the third low-pressure line 26 by the elastic force of the elastic member 28.

In this case, a portion of the hydraulic pressure of the second low-pressure line 22 is supplied to the low pressure portion 4 through the first bypass line 30. That is, minimum hydraulic pressure required to operate the low pressure portion 4 is supplied.

Figure 2:
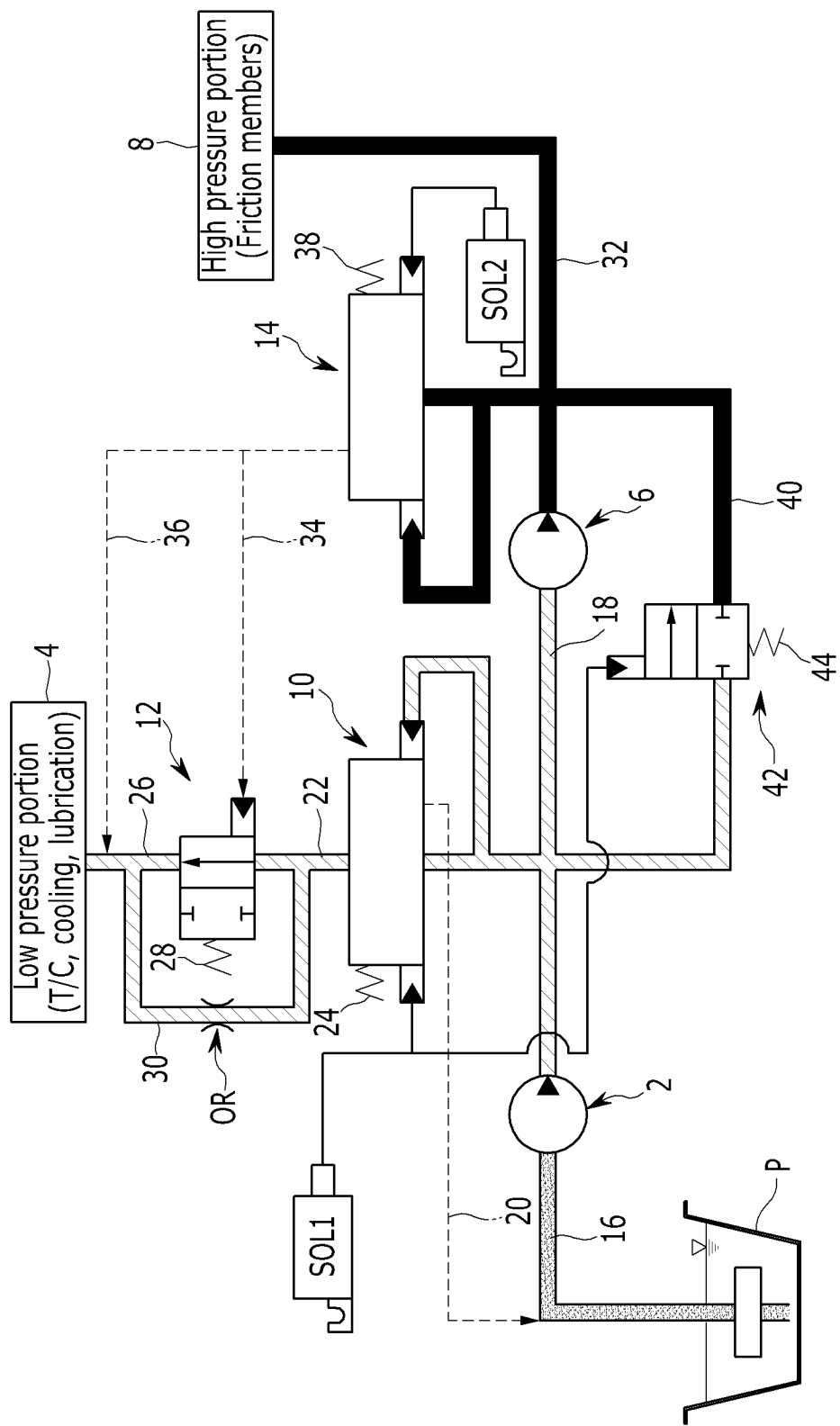
FIG. 2 is a schematic diagram of a hydraulic pressure supply system according to an exemplary embodiment of the present invention illustrating operation after starting.

FIG. 2 is a schematic diagram of a hydraulic pressure supply system according to an exemplary embodiment of the present invention illustrating operation after starting.

Referring to FIG. 2, the first solenoid valve SOL1 is switched off after the starting is completed.

In this case, the second bypass line 40 is closed, the high hydraulic pressure generated by the high-pressure hydraulic pump 6 is supplied to the high-pressure line 32, and the recirculated hydraulic pressure of the high-pressure regulator valve 14 is simultaneously supplied to the first switch valve 12 and the third low-pressure line 26.

Therefore, the first switch valve 12 connects the second low-pressure line 22 with the third low-pressure line 26 such that the hydraulic pressure supplied from the low-pressure regulator valve 10 is supplied to the low pressure portion 4. Therefore, the hydraulic pressure is normally supplied to the low pressure portion 4 and the high pressure portion 8.

Because the low-pressure hydraulic pump 2 generates the low hydraulic pressure, and the high-pressure hydraulic pump 6 increases the portion of the hydraulic pressure supplied from the low-pressure hydraulic pump 2 and generates the high hydraulic pressure, power consumption of the hydraulic pump may be minimized, durability may be improved, and noise and vibration of the hydraulic pump may be reduced according to the exemplary embodiment of the present invention.

In addition, responsiveness and stability of the system may be improved as a consequence of entirely supplying the generated hydraulic pressure to the high pressure portion when initial starting. Even though the high-pressure hydraulic pump 6 does not work, the hydraulic pressure is supplied to the high pressure portion 8. Therefore, durability of the hydraulic pump may be preserved and stability and reliability may be enhanced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A hydraulic pressure supply system of an automatic transmission for a vehicle which generates a low hydraulic pressure and a high hydraulic pressure using oil stored in an oil pan and supplies the low hydraulic pressure and the high hydraulic pressure respectively to a low pressure portion and a high pressure portion, the hydraulic pressure supply system comprising:
    a low-pressure hydraulic pump receiving the oil stored in the oil pan through an input line, generating the low hydraulic pressure, and discharging the low hydraulic pressure to a first low-pressure line;
    a low-pressure regulator valve connected to the first low-pressure line and regulating the hydraulic pressure of the first low-pressure line to stable low hydraulic pressure and supplying the stable low hydraulic pressure to a second low-pressure line;
    a first switch valve selectively connecting the second low-pressure line to a third low-pressure line connected to the low pressure portion;
    a first bypass line bypassing the first switch valve and connecting the first low-pressure line with the second low-pressure line;
    a high-pressure hydraulic pump connected to the first low-pressure line and increasing the hydraulic pressure supplied through the first low-pressure line to generate the high hydraulic pressure, and discharging the high hydraulic pressure to a high-pressure line connected to the high pressure portion;
    a second bypass line bypassing the high-pressure hydraulic pump and connecting the first low-pressure line with the high-pressure line;
    a second switch valve disposed on the second bypass line and selectively supplying the hydraulic pressure of the first low-pressure line to the high-pressure line; and
    a high-pressure regulator valve disposed on the high-pressure line, regulating the hydraulic pressure supplied from the high-pressure hydraulic pump and the hydraulic pressure selectively supplied through the second switch valve to stable high hydraulic pressure, and supplying the regulated hydraulic pressure to the high pressure portion.

2. The hydraulic pressure supply system of claim 1, wherein the low-pressure hydraulic pump is a mechanical hydraulic pump driven by an engine, and the high-pressure hydraulic pump is an electric hydraulic pump driven by a motor.

3. The hydraulic pressure supply system of claim 1, wherein the low-pressure regulator valve regulates the hydraulic pressure of the first low-pressure line to be stable by recirculating a portion of the hydraulic pressure of the first low-pressure line through a first recirculation line, and supplies the regulated hydraulic pressure to the second low-pressure line.

4. The hydraulic pressure supply system of claim 3, wherein the first recirculation line is connected to the input line.

5. The hydraulic pressure supply system of claim 1, wherein the low-pressure regulator valve is controlled by control pressure of a first solenoid valve, elastic force of an elastic member, and the hydraulic pressure of the first low-pressure line counteracting against the control pressure and the elastic force.

6. The hydraulic pressure supply system of claim 1, wherein the first switch valve is controlled by recirculated hydraulic pressure supplied from the high-pressure regulator valve and elastic force of an elastic member counteracting against the recirculated hydraulic pressure.

7. The hydraulic pressure supply system of claim 1, wherein the high-pressure regulator valve regulates the hydraulic pressure of the high-pressure line to be stable by recirculating a portion of the hydraulic pressure of the high-pressure line through a second recirculation line and a third recirculation line.

8. The hydraulic pressure supply system of claim 7, wherein the second recirculation line is connected to the first switch valve and the third recirculation line is connected to the third low-pressure line.

9. The hydraulic pressure supply system of claim 1, wherein the high-pressure regulator valve is controlled by control pressure of a second solenoid valve and elastic force of an elastic member, and the hydraulic pressure of the high-pressure line counteracting against the control pressure and the elastic force.

10. The hydraulic pressure supply system of claim 1, wherein the second switch valve is controlled by control pressure of a first solenoid valve and elastic force of an elastic member counteracting against the control pressure.

11. The hydraulic pressure supply system of claim 1, wherein an orifice is mounted on the first bypass line.

12. A hydraulic pressure supply system of an automatic transmission for a vehicle which supplies low hydraulic pressure generated at a low-pressure hydraulic pump to a low pressure portion through a low-pressure regulator valve, supplies a portion of the low hydraulic pressure to a high-pressure hydraulic pump, and supplies high hydraulic pressure generated at the high-pressure hydraulic pump to a high pressure portion through a high-pressure regulator valve, the hydraulic pressure supply system comprising:
    a first switch valve disposed on a low-pressure line connecting the low-pressure regulator valve with the low pressure portion, and selectively opening or closing the low-pressure line;
    a first bypass line bypassing the first switch valve and connecting the low-pressure regulator valve with the low pressure portion;
    a second bypass line bypassing the high-pressure hydraulic pump and connecting the low-pressure hydraulic pump with the high-pressure regulator valve; and a second switch valve disposed on the second bypass line and selectively opening or closing the second bypass line.

13. The hydraulic pressure supply system of claim 12, wherein an orifice is mounted on the first bypass line.

14. The hydraulic pressure supply system of claim 12, wherein the low-pressure regulator valve regulates hydraulic pressure supplied thereto to be stable by recirculating a portion of the hydraulic pressure to the low-pressure hydraulic pump.

15. The hydraulic pressure supply system of claim 12, wherein the high-pressure regulator valve regulates hydraulic pressure supplied thereto to be stable by supplying a portion of the hydraulic pressure to the first switch valve as control pressure and to the low pressure portion.

16. The hydraulic pressure supply system of claim 12, wherein the low-pressure regulator valve and the second switch valve receive control pressure from one solenoid valve.

17. The hydraulic pressure supply system of claim 16, wherein the high-pressure regulator valve receives control pressure from another solenoid valve.

* * * * *